United States Patent
Jung et al.

(10) Patent No.: US 9,482,902 B2
(45) Date of Patent: Nov. 1, 2016

(54) METHOD OF FORMING ALIGNMENT LAYER AND FABRICATION METHOD OF LIQUID CRYSTAL DISPLAY DEVICE USING THE SAME

(71) Applicant: SAMSUNG DISPLAY CO., LTD., Yongin, Gyeonggi-do (KR)

(72) Inventors: Jin-Soo Jung, Hwaseong-si (KR); Junwoo Lee, Seongnam-si (KR); Baekkyun Jeon, Yongin-si (KR); Bongsung Seo, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/102,103

(22) Filed: Dec. 10, 2013

(65) Prior Publication Data

US 2014/0377897 A1  Dec. 25, 2014

(30) Foreign Application Priority Data

Jun. 19, 2013  (KR) .......................... 10-2013-0070442

(51) Int. Cl.
*H01L 21/00* (2006.01)
*G02F 1/1337* (2006.01)

(52) U.S. Cl.
CPC .................. *G02F 1/133788* (2013.01); *G02F 2001/133715* (2013.01)

(58) Field of Classification Search
CPC ........... G02F 1/1337; G02F 1/133788; G02F 2001/133715; H01L 29/78669; H01L 29/78675; H01L 29/78693; H01L 31/022466; H01L 31/03044; H01L 31/035209; H01L 31/035218; H01L 31/035227; H01L 31/0547; H01L 31/055; H01L 31/072; H01L 31/0735; H01L 31/075
USPC ........ 438/30; 349/42, 46, 86, 123–124, 139, 349/182, 186–187, 194
See application file for complete search history.

(56) References Cited

U.S. PATENT DOCUMENTS

| | | | |
|---|---|---|---|
| 6,063,829 A | | 5/2000 | Endou et al. |
| 6,946,169 B1* | | 9/2005 | Tanioka et al. ............... 428/1.25 |
| 2001/0017142 A1* | | 8/2001 | Suzuki .............................. 134/1 |
| 2005/0157246 A1* | | 7/2005 | Motomatsu ................... 349/187 |
| 2006/0061719 A1* | | 3/2006 | Tomioka et al. ............. 349/123 |
| 2012/0229744 A1* | | 9/2012 | Hattori et al. ................ 349/124 |
| 2013/0010244 A1* | | 1/2013 | Suwa et al. ................... 349/123 |

(Continued)

FOREIGN PATENT DOCUMENTS

| CN | 1645194 | 7/2005 |
|---|---|---|
| CN | 101271229 | 12/2010 |

(Continued)

*Primary Examiner* — H Tsai
(74) *Attorney, Agent, or Firm* — F. Chau & Associates, LLC

(57) ABSTRACT

A liquid crystal display device is fabricated by forming a first alignment layer on a first base substrate. A second alignment layer is formed on a second base substrate. A liquid crystal is disposed on one of the first alignment layer and the second alignment layer. The first base substrate and the second base substrate are combined. At least one of the first alignment layer and the second alignment layer is formed by forming an alignment solution on a corresponding base substrate. An alignment layer is formed by curing the alignment solution. The alignment layer is aligned by radiating a light onto the base substrate, first cleaning the base substrate, and baking the alignment layer.

16 Claims, 13 Drawing Sheets

(56) References Cited

U.S. PATENT DOCUMENTS

2013/0021546 A1* 1/2013 Kikuchi et al. ............. 349/33
2013/0063672 A1* 3/2013 Kim et al. .................. 349/42
2013/0101755 A1* 4/2013 Lee et al. .................. 428/1.23
2013/0163399 A1* 6/2013 Shiono .................... B05D 5/00
                                                    369/112.02
2015/0119522 A1* 4/2015 Ooki ................... G02F 1/133723
                                                    524/538

FOREIGN PATENT DOCUMENTS

| CN | 102981314 | 3/2013 |
| JP | 09-297313 | 11/1997 |
| JP | 2004-206091 | 7/2004 |
| JP | 2008083222 | 4/2008 |
| JP | 2008224923 | 9/2008 |
| TW | 439004 | 6/2001 |

* cited by examiner

METHOD OF FORMING ALIGNMENT LAYER AND FABRICATION METHOD OF LIQUID CRYSTAL DISPLAY DEVICE USING THE SAME

CROSS-REFERENCE TO RELATED APPLICATION

This U.S. non-provisional patent application claims priority under 35 U.S.C. §119 to Korean Patent Application No. 10-2013-0070442, filed on Jun. 19, 2013, the disclosure of which is incorporated by reference herein in its entirety.

TECHNICAL FIELD

The present disclosure relates to a method of forming an alignment layer, and more particularly to a fabrication method of a liquid crystal display device using the same.

DISCUSSION OF RELATED ART

In general, liquid crystal display devices are classified into a twisted nematic liquid crystal display device, a horizontal electric field applying type liquid crystal display device, or a vertical alignment liquid crystal display device.

Without applying an electric field, the vertical alignment liquid crystal display device is aligned in a first direction, and the longitudinal axes of liquid crystal molecules are aligned vertically with respect to the surface of a substrate. Accordingly, a viewing angle is large and contrast ratio is great.

To align the liquid crystal molecules in the first direction without applying the electric field, a rubbing method or a photo-alignment method may be used.

SUMMARY

The present disclosure provides a method of forming an alignment layer by using a photo-alignment method.

The present disclosure also provides a liquid crystal display device with high display quality fabricated by using the method of foaming the alignment layer.

Exemplary embodiments of the present invention provide a fabrication method of a liquid crystal display device including forming a first alignment layer on a first base substrate and forming a second alignment layer on a second base substrate. The fabrication method includes dropping a liquid crystal on one of the first alignment layer and the second alignment layer, and combining the first base substrate and the second base substrate.

At least one of the first alignment layer and the second alignment layer is formed by forming an alignment solution on a corresponding base substrate and curing the alignment solution to form an alignment layer. At least one of the first alignment layer and the second alignment layer is formed by radiating a light onto the base substrate to align the alignment layer, first cleaning the base substrate, and baking the alignment layer.

In at least one exemplary embodiment of the present invention, the first cleaning may be a wet cleaning. In this case, the base substrate may be cleaned using de-ionized water. The first cleaning may further include using a bubble jet and an air knife.

In an exemplary embodiment of the present invention, the first cleaning may be a dry cleaning. In this case, the first cleaning may be conducted using ultrasonic waves.

In accordance with an exemplary embodiment of the present invention, detecting of foreign materials on the base substrate may be conducted after exposing the alignment solution.

According to exemplary embodiments of the present invention, a method of forming an alignment layer using a photo-alignment method is provided.

According to exemplary embodiments of the present invention, a liquid crystal display device having high quality with a decreased defect ratio is provided.

BRIEF DESCRIPTION OF THE DRAWINGS

The above and other features of the inventive concept will become more apparent by describing in detail exemplary embodiments thereof, with reference to the accompanying drawings in which.

DETAILED DESCRIPTION OF THE EMBODIMENTS

Figure 1:
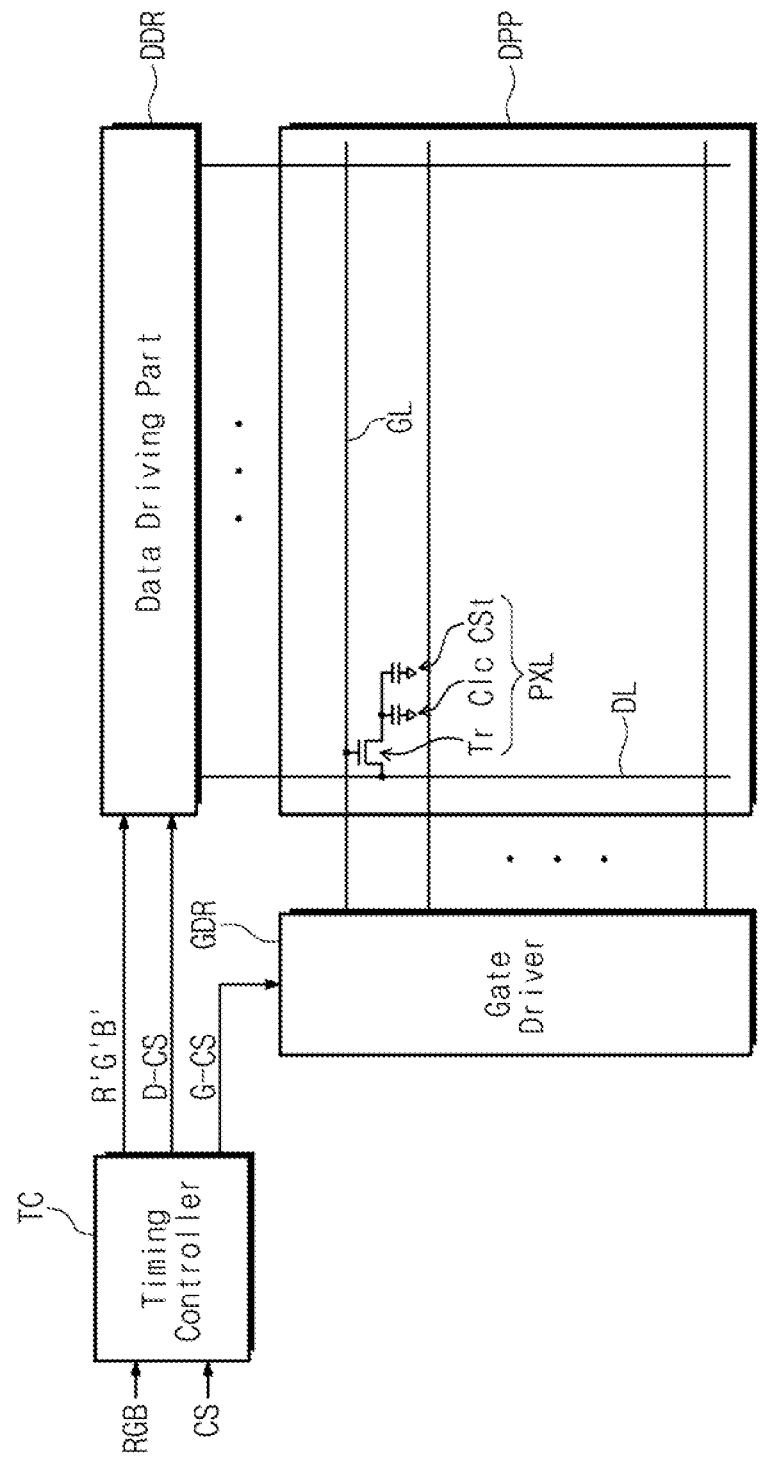
FIG. 1 is a block diagram of a liquid crystal display device according to an exemplary embodiment of the present invention.

Exemplary embodiments of the present invention will be described below in more detail with reference to the accompanying drawings. An embodiment of the present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the drawings, analogous reference numerals may be used for analogous elements. The dimensions of layers and regions may be exaggerated for clarity of illustration. It will be understood that, although the terms first, second, etc. may be used herein to describe various elements, these elements should not be limited by these terms.

It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals may refer to like elements throughout.

Hereinafter, exemplary embodiments of the present invention will be described in detail with reference to the accompanying drawings.

Figure 2:
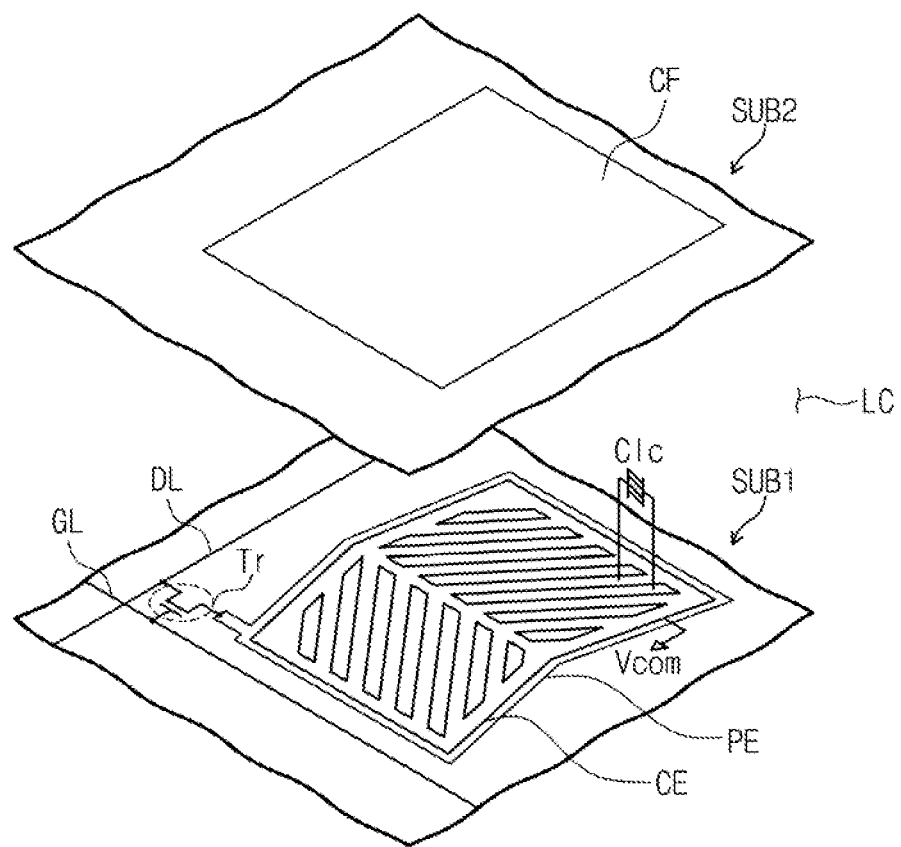
FIG. 2 is an equivalent circuit diagram of a pixel illustrated in FIG. 1.

FIG. 1 is a block diagram of a liquid crystal display device according to an exemplary embodiment of the present invention, and FIG. 2 is an equivalent circuit diagram of a pixel illustrated in FIG. 1.

Referring to FIG. 1, a liquid crystal display device in accordance with an exemplary embodiment of the present invention may include an image display part DPP, a gate driving part GDR and a data driving part DDR for driving the image display part DPP, and a timing controller TC for controlling the driving of the gate driving part GDR and the data driving part DDR.

The image display part DPP may include a plurality of gate lines GL, a plurality of data lines DL and a plurality of pixels PXL. As illustrated in FIG. 2, for example, the image display part DPP may include a liquid crystal display panel including a first substrate SUB1, a second substrate SUB2 facing the first substrate SUB1, and a liquid crystal layer LC disposed between the first substrate SUB1 and the second substrate SUB2.

The plurality of gate lines GL and the plurality of data lines DL are provided on the first substrate SUB1. The plurality of gate lines GL may be extended in a column direction and arranged in parallel to each other in a row direction. The plurality of data lines DL may be extended in the row direction and arranged in parallel to each other in the column direction.

The plurality of pixels PXL may be respectively connected to the gate line GL and the data line DL, and each of the pixels PXL may include a thin film transistor (Tr), a liquid crystal capacitor Clc and a storage capacitor Cst.

The thin film transistor (Tr) may include a gate electrode connected to the gate line GL, a source electrode connected to the data line DL, and a drain electrode connected to the liquid crystal capacitor Clc and the storage capacitor Cst.

The liquid crystal capacitor Clc may include a pixel electrode PE and a common electrode CE provided on the first substrate SUB1 as two terminals. The liquid crystal layer LC may function as a dielectric. The pixel electrode PE may make an electric connection with the drain electrode of the thin film transistor Tr, and the common electrode CE may receive a reference voltage Vcom.

Each of the pixels PXL may include a color filter CF provided on the second substrate SUB2 corresponding to the pixel electrode PE and illustrating one or more of a plurality of base colors. Different from FIG. 2, the color filter CF may be formed on or under the pixel electrode PE provided on the first substrate SUB1.

Referring to FIG. 1, the timing controller TC may receive a plurality of image signals RGB and a plurality of control signals CS from exterior of a liquid crystal display device. The timing controller TC may transform the data format of the image signals RGB to match an interface specification of the data driving part DDR, and provide the transformed image signals R'G'B' to the data driving part DDR. The timing controller TC may generate a data control signal D-CS, for example, an output initiation signal, a horizontal initiation signal, etc. The timing controller TC may generate a gate control signal G-CS, for example, a vertical initiation signal, a vertical clock signal and a vertical clock bar signal, based on the plurality of control signals CS. The data control signal D-CS may be provided to the data driving part DDR, and the gate control signal G-CS may be provided to the gate driving part GDR.

The gate driving part GDR may output a gate signal in sequence in response to the gate control signal G-CS provided from the timing controller TC. Thus, the plurality of pixels PXL may be scanned in sequence by the column unit by the gate signal.

The data driving part DDR transforms the image signals R'G'B' into data voltages in response to the data control signal D-CS provided from the timing controller TC and outputs the data voltages. The outputted data voltages may be applied to the image display part DPP.

Therefore, each of the pixels PXL may be turned-on by the gate signal, and the turned-on pixels PXL may receive corresponding data voltages from the data driving part DDR to display an image having a desired gray scale.

Figure 3:
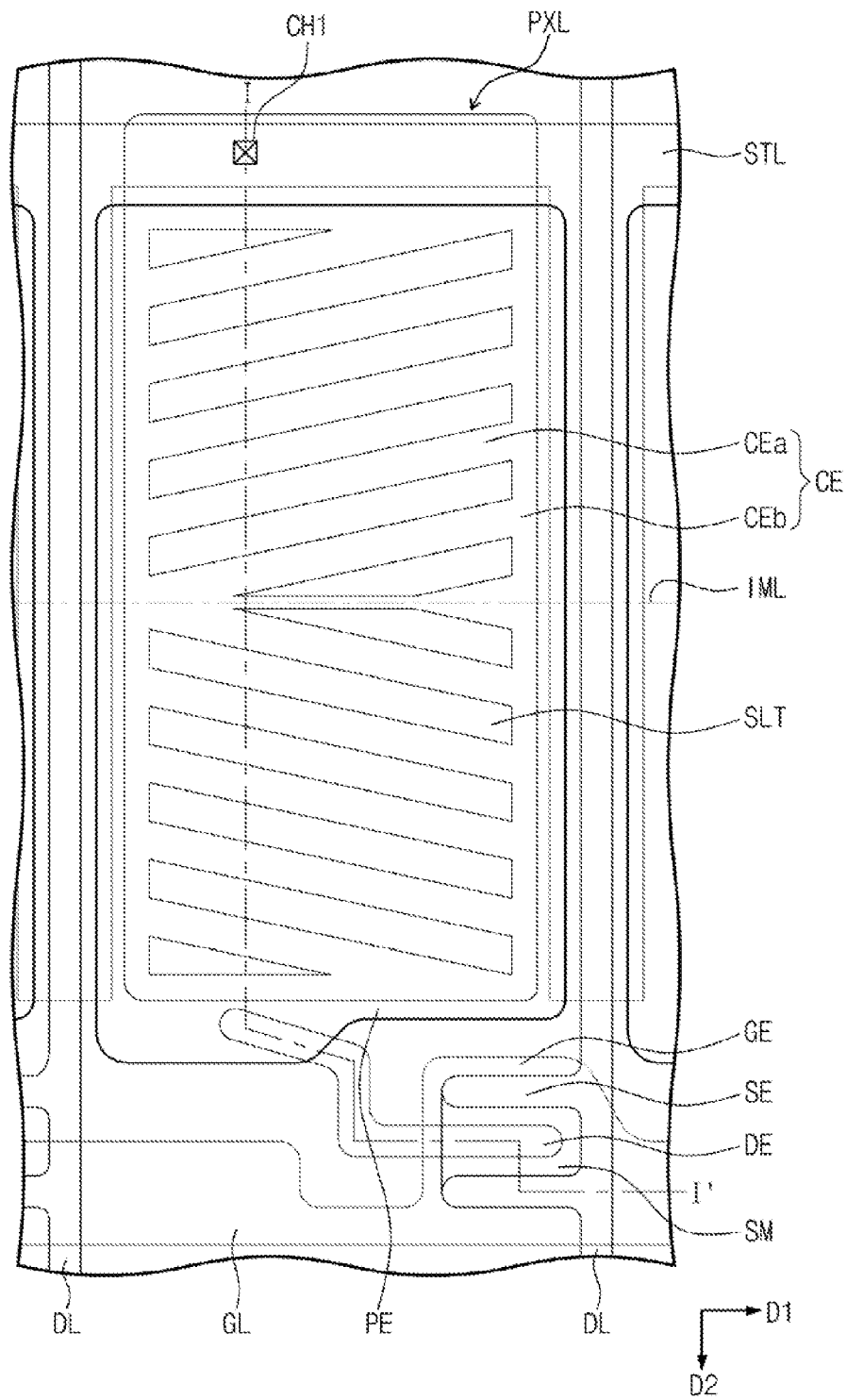
FIG. 3 is a plan view of a liquid crystal display device according to an exemplary embodiment of the present invention.
Figure 4:
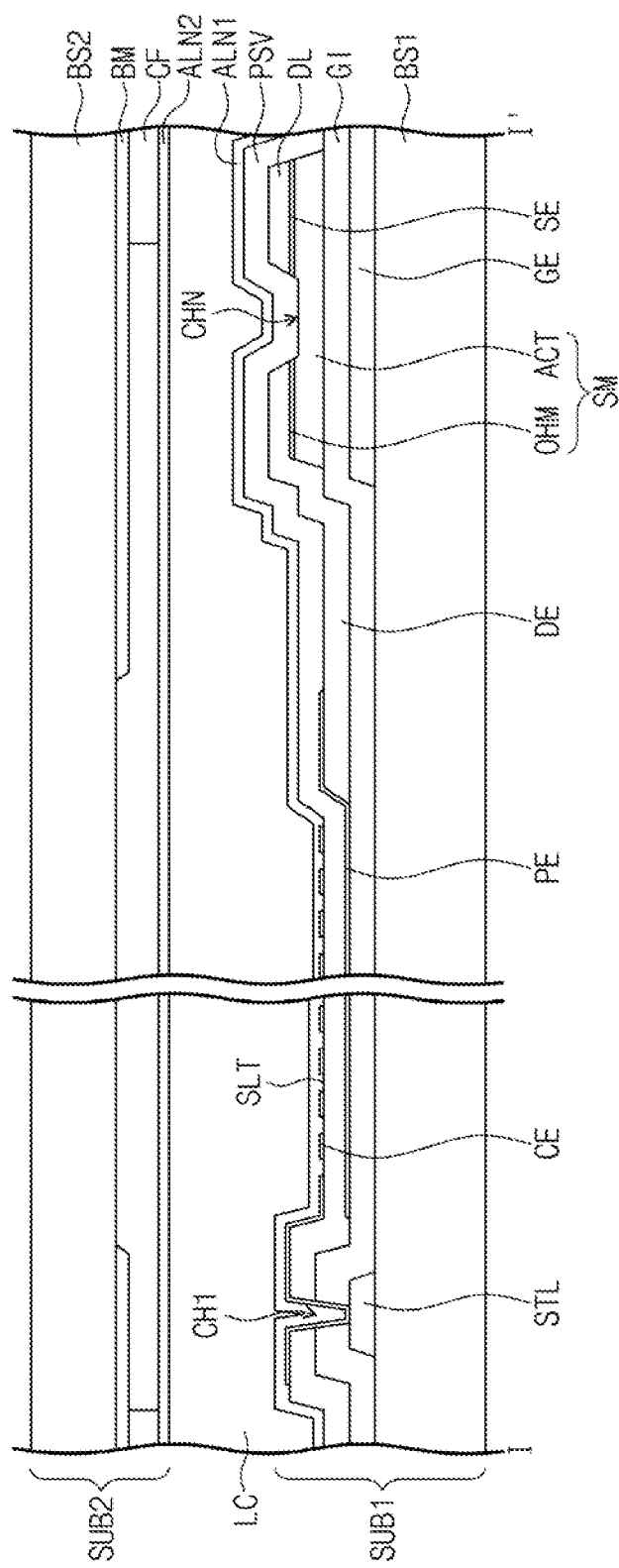
FIG. 4 is a cross-sectional view taken along a line I-I' in FIG. 3.

FIG. 3 is a plan view of a liquid crystal display device according to an exemplary embodiment of the present invention, and FIG. 4 is a cross-sectional view taken along a line I-I' in FIG. 3. Since each of the pixels has the same structure, one pixel may be illustrated along with the gate lines and the data lines adjacent to the one pixel among the pixels for convenience of explanation.

Referring to FIGS. 2 and 4, a liquid crystal display device includes a first substrate SUB1, a second substrate SUB2 facing the first substrate SUB1, and a liquid crystal layer LC disposed between the first substrate SUB1 and the second substrate SUB2.

The first substrate SUB1 may include a first base substrate BS1, a plurality of gate lines GL, a plurality of data lines DL, a plurality of pixels PXL, and a first alignment layer ALN1 covering the pixels. The first base substrate BS1 may have an approximately tetragonal shape and may be formed by using a transparent insulating material.

The gate lines GL may be extended in a first direction D1 on the first base substrate BS1.

A gate insulating layer GI may be provided on the first base substrate BS1 on which the gate lines GL are formed. The gate insulating layer GI may be formed by using an insulating material, for example, silicon nitride, silicon oxide, or the like.

The data lines DL may be extended in a second direction D2 crossing at right angles with respect to the first direction D1 across the gate lines GL and the gate insulating layer GI.

Each of the pixels PXL may be connected to one of the gate lines GL and one of the data lines DL. Each of the pixels may include a thin film transistor, a pixel electrode PE connected to the thin film transistor, a passivation layer PSV covering the pixel electrode PE, a common electrode CE provided with an interval from the pixel electrode PE, and a storage line STL connected to the common electrode CE. The storage line STL may be overlapped with the pixel electrode PE to form a storage capacitor. The thin film transistor may include a gate electrode GE, a gate insulating layer GI, a semiconductor pattern SM, a source electrode SE and a drain electrode DE.

The gate electrode GE may extrude from the gate line GL or may be provided on a portion of the gate line GL.

The gate electrode GE may include a metal. The gate electrode GE may be formed by using, for example, nickel, chromium, molybdenum, aluminum, titanium, copper, tungsten, or an alloy thereof. The gate electrode GE may be formed as a single layer or as a multi-layer by using the metal. For example, the gate electrode GE may be a triple-layer obtained by stacking molybdenum, aluminum and molybdenum one by one, or a double-layer obtained by stacking titanium and copper one by one. Alternatively, the gate electrode GE may be a single layer obtained by using, for example, an alloy of titanium and copper.

The gate insulating layer GI may be provided on the whole surface of the first base substrate BS1 and may cover the gate line GL and the gate electrode GE.

The semiconductor pattern SM may be provided on the gate insulating layer GI. The semiconductor layer SM may be provided on the gate electrode GE across the gate insulating layer GI. A portion of the semiconductor pattern SM may be overlapped with the gate electrode GE. The semiconductor pattern SM may include an active pattern ACT provided on the gate insulating layer GI and an ohmic contact layer OHM formed on the active pattern ACT. The active pattern ACT may be formed as an amorphous silicon thin film, and the ohmic contact layer OHM may be formed as an n+ amorphous silicon thin film. The ohmic contact layer OHM may be provided between a portion of the active pattern ACT and a source electrode SE described in a following step, and between another portion of the active pattern ACT and a drain electrode DE described in a following step. The ohmic contact layer OHM makes ohmic contacts between the active pattern ACT and the source electrode SE and the drain electrode DE, respectively.

The source electrode SE may be branched from the data line DL. The source electrode SE may be formed on the ohmic contact layer OHM, and a portion of the source electrode SE may be overlapped with the gate electrode GE.

The drain electrode may be provided with an interval from the source electrode SE across the semiconductor pattern SM. The drain electrode DE may be formed on the ohmic contact layer, and a portion of the drain electrode DE may be overlapped with the gate electrode GE.

The source electrode SE and the drain electrode DE may be formed by using, for example, nickel, chromium, molybdenum, aluminum, titanium, copper, tungsten, and/or an alloy thereof. The source electrode SE and the drain electrode DE may be formed as a single layer or a multi-layer using the metal. For example, the source electrode SE and the drain electrode DE may be a double-layer obtained by stacking titanium and copper one by one. Alternatively, the source electrode SE and the drain electrode DE may be a single layer obtained by using, for example, an alloy of titanium and copper.

The upper surface of the active pattern ACT between the source electrode SE and the drain electrode DE may be exposed and a channel part CHN forming a conductive channel between the source electrode SE and the drain electrode DE may be obtained according to the application of the voltage of the gate electrode GE. The source electrode SE and the drain electrode DE may be overlapped with a portion of the semiconductor pattern SM excluding the channel part CHN separately formed between the source electrode SE and the drain electrode DE.

The pixel electrode PE may be provided on the drain electrode DE and the gate insulting layer GI. A portion of the pixel electrode PE may be provided directly on a portion of the drain electrode DE and the gate insulating layer GI and may be connected to the drain electrode DE. Thus, a portion of the pixel electrode PE may be overlapped with the drain electrode DE from a plan view. The pixel electrode PE may have approximately a tetragonal shape from the plan view, however the pixel electrode PE may have various shapes according to the shapes of each pixel PXL without limitation. The pixel electrode PE may be formed as one plate excluding a pattern such as a slit.

The pixel electrode PE may be formed by using a transparent conductive material. For example, the pixel electrode PE may be formed by using a transparent conductive oxide. The transparent conductive oxide may include, for example, indium tin oxide (ITO), indium zinc oxide (IZO), indium tin zinc oxide (ITZO), and the like.

The passivation layer PSV may be provided on the first base substrate BS1 including the pixel electrode PE formed thereon. The passivation layer PSV may cover the channel part CHN and the pixel electrode PE. The passivation layer PSV may include, for example, silicon nitride, silicon oxide, and the like.

The common electrode CE may be formed on the passivation layer PSV. The common electrode CE may be overlapped with a portion of the pixel electrode PE. The common electrode CE might not be overlapped with the overlapped portion of the pixel electrode PE with the drain electrode DE from the plan view. For example, when the overlapped region of the pixel electrode PE with the drain electrode DE is called a first region PE1, and the non-overlapped region of the pixel electrode PE with the drain electrode DE is called a second region PE2, the common electrode CE is not overlapped with the first region PE1 and is separated from the first region PE1.

The common electrode CE may include a plurality of slits SLT formed by removing a portion of the common electrode CE. The slits SLT may be provided to have an inclined direction with respect to the first direction D1 or the second direction D2. For example, the common electrode CE may include a plurality of regions including the slits SLT having different inclined directions from each other. In this case, the regions may be substantially line symmetric with respect to an imaginary line crossing the pixel PXL, or may be substantially point symmetric with respect to a point in the pixel. In FIG. 3, for example, the slits SLT are illustrated as being line symmetric with respect to an imaginary line IML crossing the pixel in the first direction.

The common electrode CE may include a stem part CEa formed for each pixel and a plurality of branch parts CEb separated by the slits SLT and extruded and extended from the stem part CEa. The branch parts CEb may be separated from each other by a desired interval. The branch parts CEb of the common electrode CE may form an electric field with the pixel electrode PE.

The branch parts CEb may be formed to be extended in parallel in a desired direction. The stem part CEa and the branch parts CEb may be provided as various shapes. For example, the branch parts CEb may be extruded and extended in both directions perpendicular to the extended direction of the stem part CEa. Alternatively, the stem part CEa may be fo med as a bent shape with multiple bends.

The common electrode CE may be formed by using a transparent conductive material. The common electrode CE may be formed by using a conductive metal oxide, for example, ITO, IZO, ITZO, or the like.

The storage line STL may be provided between the first base substrate BS1 and the gate insulating layer GI with a distance from the gate lines GL. The storage line STL may be formed by using the same material as the gate line GL, and may be formed with the gate line GL through one patterning process.

The storage line STL may be extended in the first direction and extruded in the second direction to be overlapped with a portion of the data line DL and the pixel electrode PE. The storage line STL and the pixel electrode PE may form a storage capacitor with the interposed gate insulating layer GI.

In the gate insulating layer GI and the passivation layer PSV, a portion of the gate insulating layer GI and a portion of the passivation layer PSV may be removed to form a first contact hole exposing a portion of the storage line STL. The common electrode CE may be connected to the storage line STL through the first contact hole. The common voltage of the same level is applied to the storage line STL and the common electrode CE. Since the common voltage is applied to the common electrode CE of each pixel through the storage line STL, a voltage of uniform level without voltage drop may be applied to the common electrode CE in a whole display region.

The first alignment layer ALN1 may be provided on the first base substrate SUB1 on which the common electrode CE is formed, and may align liquid crystal molecules in the liquid crystal layer. The first alignment layer ALN1 may be obtained by, for example, coating component materials of an optical alignment layer on a substrate and exposing partially polarized or wholly polarized light to perform a photo reaction, and may align the liquid crystal molecules in the liquid crystal layer in one direction.

The first alignment layer ALN1 may include one or more materials that conduct a reaction with the provision of light and impart anisotropic properties to the first alignment layer ALN1. For example, the first alignment layer ALN1 may be formed with a polymer having a photo-reactive group, thereby the first alignment layer ALN1 may have aligning properties when the photo-reactive group is exposed to the light, according to the exposed direction of the light. The polymer may include, for example, polyamic acid, a polymer obtained by partially imidizing the polyamic acid, or polyimide obtained by cyclodehydrizing the polyamic acid.

In accordance with an exemplary embodiment of the present invention, the photo-reactive group may be a functional group that may induce photo-decomposition or photo-isomerization.

In accordance with an exemplary embodiment, when the first alignment layer ALN1 is imparted with the anisotropic properties by the photo-isomerization, the first alignment layer ALN1 may be polyamic acid or polyimide including cyclobutane-based dianhydride or derivatives thereof and diamine. The cyclobutane-based dianhydride may be cyclobutane tetracarboxylic acid dianhydride, and the diamine may be an aromatic diamine. The cyclobutane tetracarboxylic acid dianhydride and the derivatives thereof may be expressed by the following Chemical Formula 1.

[Chemical Formula 1]

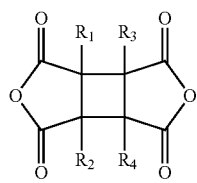

In Chemical Formula 1, $R_1$, $R_2$, $R_3$ and $R_4$ independently represents a hydrogen atom, a fluorine atom, or an alkyl group or an alkoxy group having 1 to 6 carbon atoms.

The aromatic diamine includes at least one of the following Chemical Formula 2.

[Chemical Formula 2]

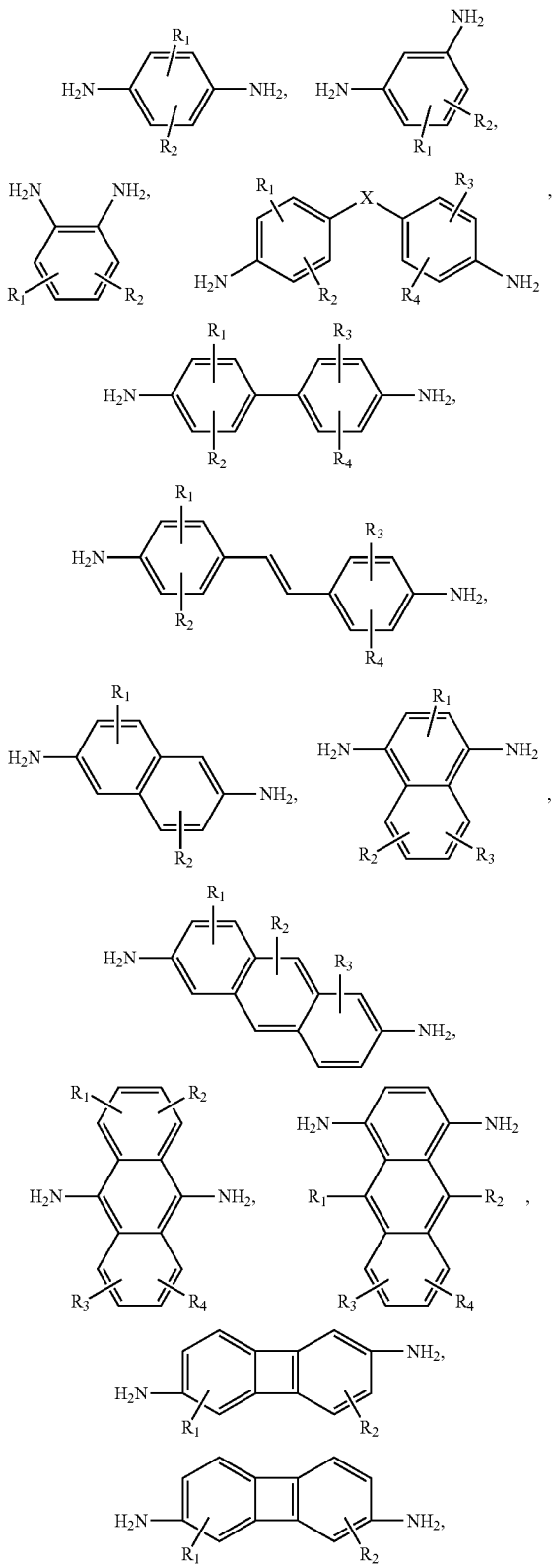

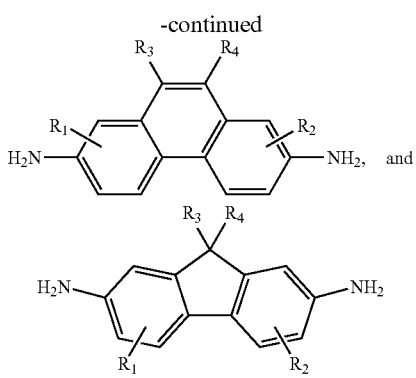

$R_1$, $R_2$, $R_3$ and $R_4$ independently represent, for example, a hydrogen atom, a fluorine atom, an alkyl group or an alkoxy group having 1 to 6 carbon atoms, a vinyl group ($-(CH_2)_m-CH=CH_2$, m=0, 1, 2), or an acetyl group ($-(CH_2)_n-C\equiv CH$, n=0, 1, 2), and X is $-S-$, $-CO-$, or $-NH-$.

In accordance with an exemplary embodiment of the present invention, when the first alignment layer ALN1 is imparted with the anisotropic properties by the photo-isomerization, the photo-reactive group of the first alignment layer ALN1 may be polyamic acid or polyimide including an azobenzene-based mono-molecular compound or a polymeric monomer.

The azobenzene-based compound may impart the anisotropic properties to the first alignment layer ALN1 by generating the photo-isomerization. When the azobenzene-based compound is exposed to straight polarized ultraviolet light, a trans-azobenzene-based compound is transformed to a cis-azobenzene-based compound as expressed in following Chemical Formula 3.

[Chemical Formula 3]

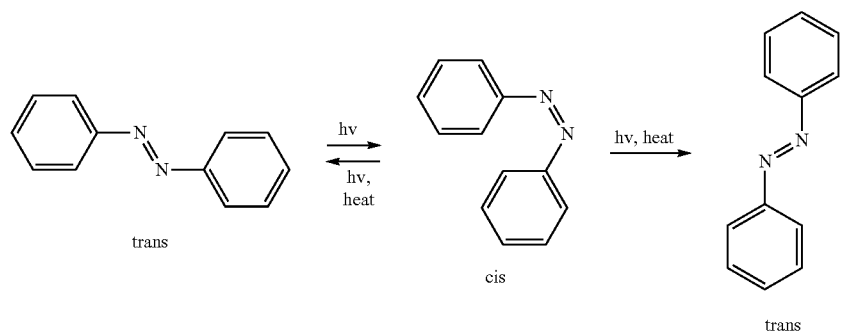

Since the cis-type azobenzene-based compound is chemically unstable compared with the trans-type azobenzene-based compound, the cis-type is subject to be transformed into the trans-type by absorbing heat or visible light. For example, the cis-type may be transformed into the trans-type at the left side or the trans-type at the right side in Chemical Formula 3 with equiprobability. When the ultraviolet light is absorbed continuously, the ratio of the trans-type at the right side increases, and an average alignment direction of the azobenzene-based compound may become vertical to the polarization direction of the ultraviolet light. By using the above-described phenomenon, the alignment direction of the azobenzene-based compound may coincide, the anisotropic properties may be imparted to the photo alignment layer, and the alignment of the liquid crystal molecules on the alignment layer may be controlled.

[Chemical Formula 4]

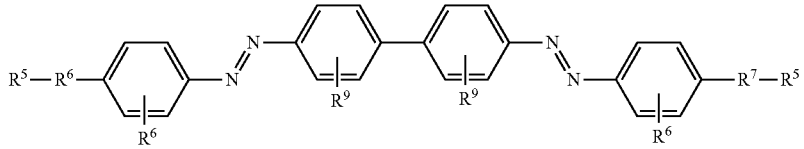

In Chemical Formula 4, each $R^5$ independently represents a hydroxyl group. $R^6$ represents a connecting group expressed by $-(A^5-B^5-A^5)_m-(D^5)-$, $R^7$ is a connecting group expressed by $-(D^5)_n-(A^5-B^5-A^5)_m-$. Wherein, $A^5$ represents a bivalent hydrocarbon group, and $B^5$ represents —O—, —COO—, —COO—, —CONH—, —NHCO—, —NHCOO— or —OCONH—, and m is an integer of 0 to 3. $D^5$ represents the bivalent hydrocarbon group when m is 0, and $D^5$ represents —O—, —COO—, —COO—, —CONH—, —NHCO—, —NHCOO— or —OCONH— when m is an integer of 1 to 3. Here, n is 0 or 1. Each $R^8$ independently represents a halogen atom, a carboxyl group, a halogenated methyl group, a halogenated methoxy group, a cyano group, a nitro group, a methoxy group or a methoxycarbonyl group, for example. The carboxyl group may form a salt with an alkali metal. Each $R^9$ independently represents a carboxyl group, a sulfonyl group, a nitro group, an amino group or a hydroxyl group, for example. The carboxyl group and the sulfonyl group may form a salt with the alkali metal.

The second substrate SUB2 may include a second base substrate BS2, color filters CF, black matrix BM and a second alignment layer ALN2.

The color filters CF are formed to provide colors to the light passing through the liquid crystal layer LC. The color filters CF include, for example, a red color filter, a green color filter, and a blue color filter. The red color filter, the green color filter or the blue color filter may be disposed by one to one correspondence to each pixel PXL. The black matrix BM may be disposed for blocking leaked light between adjacent pixels.

The second alignment layer ALN2 may be provided on the color filter CF and may align the liquid crystal molecules in the liquid crystal layer LC similarly to the first alignment layer ALN1. The second alignment layer ALN2 may be formed by coating the component materials of the photo alignment layer on a substrate and exposing partially polarized light or wholly polarized light to induce a photo reaction. The second alignment layer ALN2 aligns the liquid crystal molecules in the liquid crystal layer LC in one direction.

The component materials of the second alignment layer ALN2 may be the same as or different from the component materials of the first alignment layer ALN1.

The liquid crystal layer LC including the liquid crystal molecules is provided between the first substrate SUB1 and the second substrate SUB2.

In the liquid crystal display device, when a gate signal is applied to the gate line GL, the thin film transistor may be turned-on. Thus, the data signal applied to the data line DL may be applied to the pixel electrode PE through the thin film transistor. When the thin film transistor is turned-on, and the data signal is applied to the pixel electrode PE, an electric field may be formed between the pixel electrode PE and the common electrode CE. For example, the voltage applied to the pixel electrode PE may be greater or smaller than the voltage applied to the common electrode CE. For example, 0V of the voltage may be applied to the common electrode CE, and 7V of the voltage may be applied to the pixel electrode PE. Due to the electric field generated by the voltage difference applied to the common electrode CE and the pixel electrode PE, the liquid crystal molecules may be driven. Thus, the amount of light passing through the liquid crystal layer LC may be changed to display an image.

In the liquid crystal display device in accordance with an exemplary embodiment of the present invention, the pixel electrode is formed as one plate, and the common electrode is provided on the pixel electrode to have a plurality of slits, however the present invention is not limited thereto. The plurality of slits may be provided in the pixel electrode. In this case, the pixel electrode may be provided on the common electrode. In the above-described exemplary embodiments of the present invention, the liquid crystal display device may be driven by a plane-to-line switching mode. In accordance with an exemplary embodiment of the present invention, the pixel electrode may be formed as one plate without slits. However, the plurality of slits may be also formed in the pixel electrode. In this case, the pixel electrode may also include branch parts. The branch parts of the pixel electrode may be alternately disposed on a plane with the branch parts of the common electrode, and the liquid crystal display device may be operated by an in plane switching (IPS) mode. The structure of the liquid crystal display device may also have another mode other than the PLS mode or the IPS mode.

Hereinafter, a fabrication method of a liquid crystal display device in accordance with exemplary embodiments of the present invention will be explained in detail. For convenience of explanation, descriptions of repeated parts of the above-described liquid crystal display device may be omitted.

Figure 5:
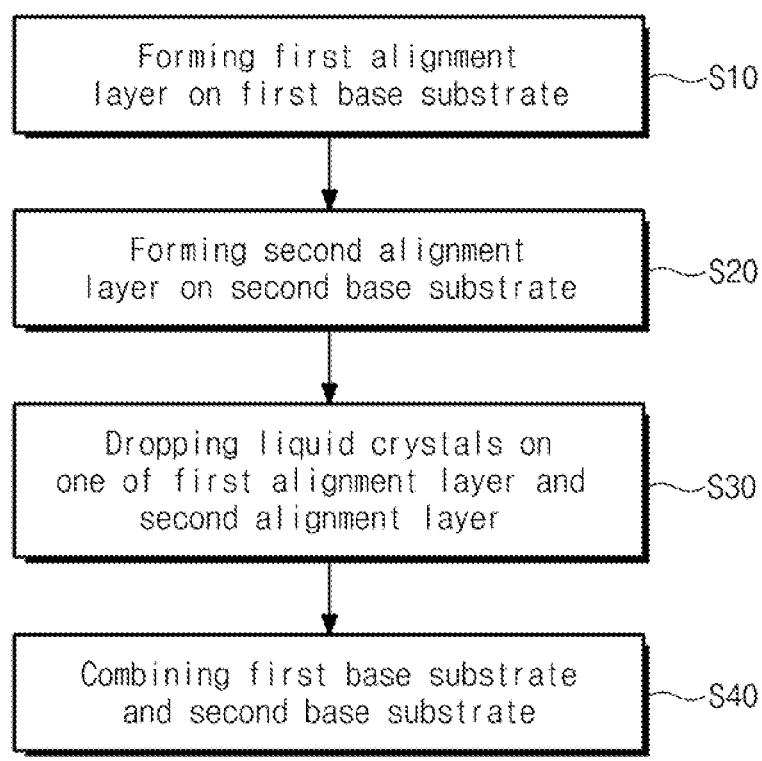
FIG. 5 is a flow chart illustrating a fabrication method of a liquid crystal display device according to an exemplary embodiment of the present invention.

FIG. 5 is a flow chart illustrating a fabrication method of a liquid crystal display device according to an exemplary embodiment of the present invention.

Referring to FIG. 5, the fabrication method of the liquid crystal display device in accordance with an exemplary embodiment of the present invention includes forming a first substrate by forming a first alignment layer on the first base substrate (S10), forming a second substrate by forming a second alignment layer on the second base substrate (S20), dropping a liquid crystal between the first substrate and the second substrate, and combining the first base substrate and the second base substrate (S40).

The first substrate may be formed by forming gate lines, data lines, a plurality of pixels connected to the gate lines and the data lines, and the like on the first base substrate, and forming the first alignment layer on the pixels.

Figure 6:
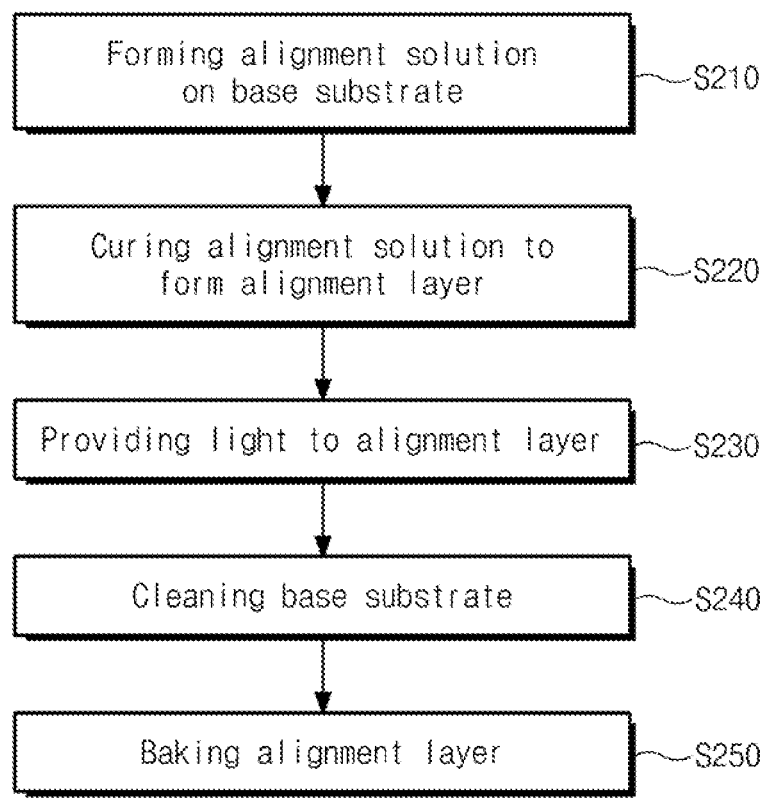
FIG. 6 is a flow chart illustrating a method of forming an alignment layer according to an exemplary embodiment of the present invention.

FIG. 6 is a flow chart illustrating a method of forming an alignment layer (S20) according to an exemplary embodiment of the present invention. At least one of the first alignment layer and the second alignment layer may be formed by the method illustrated in FIG. 6.

Referring to FIG. 6, an alignment solution is formed on a base substrate (S210), the alignment solution is cured to form an alignment layer (S220), and light is provided to the alignment layer to align the alignment layer (S230). Then, the base substrate is cleaned (S240), and the alignment layer is baked (S250) to form the alignment layer.

Figure 7:
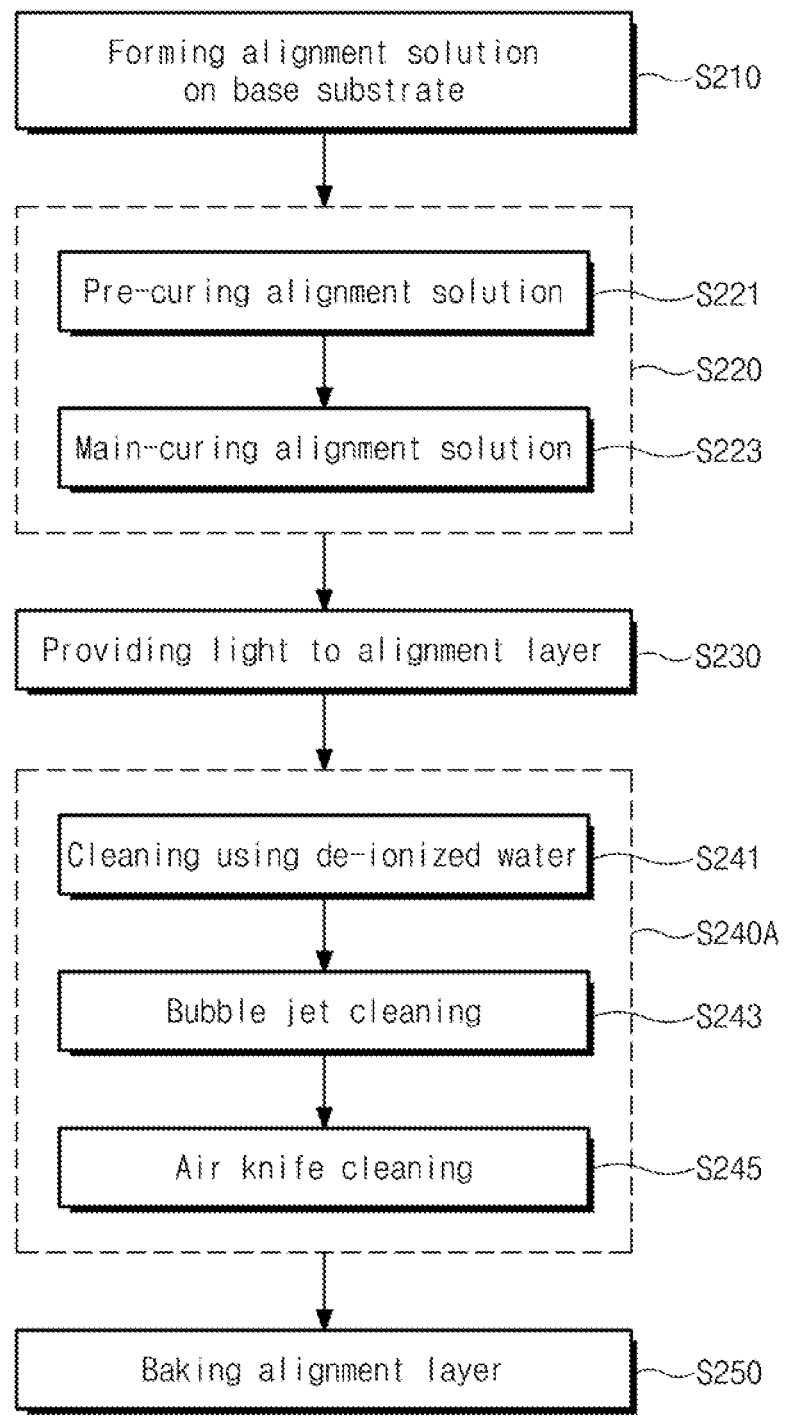
FIG. 7 is a flow chart illustrating a method of forming an alignment layer according to an exemplary embodiment of the present invention.

FIG. 7 is a flow chart illustrating a method of forming an alignment layer according to an exemplary embodiment of the present invention. Referring to FIGS. 6 and 7, the method of forming the alignment layer in accordance with an exemplary embodiment will be described in detail herein below.

First, an alignment solution is formed on a base substrate (S210). The alignment solution may include a polymer monomer or a polymer precursor including, for example, a functional group inducing photo-decomposition or photo-isomerization (e.g., a photo-reactive group). The polymer monomer or the polymer precursor may be provided along with a solvent, and may include a material such as a photo initiator.

The method of forming the alignment solution on the base substrate need not be limited to a specific method. Since the alignment solution may be provided as a fluid state, the alignment solution may be formed on the first base substrate by, for example, a spin coating method, a slit coating method, an inkjet coating method, and the like.

Then, the alignment solution is cured (S220). The curing process may include a pre-curing step (S221), which may be conducted at a first temperature and a main-curing step (S223), which may be conducted at a second temperature higher than the first temperature. The main-curing step may be conducted for a longer time than the pre-curing step. Most of the solvents in the alignment solution may be removed during the pre-curing step, and the polymerization of the monomer or the precursor may be substantially completed during the main-curing step.

In an exemplary embodiment of the present invention, the first temperature may be from about 50 degrees Celsius (C) to about 80 degrees C., or from about 60 degrees C. to about 80 degrees C., or, for example, about 65 degrees C. The pre-curing process my be conducted for from about 60 seconds to about 300 seconds, or from about 60 seconds to about 120 second, or, for example, about 70 seconds.

In an exemplary embodiment of the present invention, the second temperature may be from about 150 degrees C. to about 270 degrees C., or from about 170 degrees C. to about 240 degrees C., or, for example, about 210 degrees C. The main-curing process may be conducted for from about 500 seconds to about 1,000 seconds, or from about 700 seconds to about 900 seconds, or, for example, about 800 seconds.

Then, an exposing process for aligning the alignment layer by providing light to the alignment layer may be conducted (S230). Through the aligning process of the alignment layer, the anisotropic properties may be imparted to the alignment layer.

The light may be any light that may induce the reaction of the photo-reactive group, and may be, for example, at least one of ultraviolet light, infrared light, far infrared light, electron ray and radioactive ray. In an exemplary embodiment of the present invention, the light may be ultraviolet light. In this case, the light may be a light from about 240 nm to about 270 nm, or a light from about 250 nm to about 260 nm, or a light of about 254 nm. The alignment layer may be exposed to the light with an exposing dosage of from about 0.3 J to about 1.5 J, or from about 0.4 J to about 1.2 J, or from about 0.5 J to about 1 J. The light may be radiated onto the alignment layer in a vertical direction or a slanted direction with respect to the first base substrate. The exposing angle of the light and the exposing dosage may vary according to the driving mode of the liquid crystal display device, the physical properties of the materials of the alignment layer, and the like.

Then, the base substrate is cleaned. The cleaning step may be called a first cleaning to differentiate another cleaning in another step in subsequent processes.

The first cleaning step may be a wet cleaning (e.g., S240A of FIG. 7). The wet cleaning may include using a solvent and may be conducted by immersing the base substrate into the solvent, or by spraying the solvent onto the base substrate by using, for example, a spraying nozzle. In the wet cleaning, de-ionized water (DI water) may be used. The first cleaning step in accordance with an exemplary embodiment of the present invention may be conducted by using the DI water.

After cleaning using the DI water, a cleaning step using a bubble jet (S243) and/or a cleaning step using an air knife (S245) may be conducted. The bubble jet cleaning is a wet cleaning and may be conducted by spraying bubbles onto the base substrate using the spray nozzle, and the like. The air knife cleaning is a dry cleaning and may be conducted by spraying compressed air onto the base substrate using the spray nozzle, and the like.

Then, the alignment layer is baked (S250). Through the baking, unstable functional groups (e.g., unstable functional groups formed after exposing) may be stabilized to increase the alignment properties. Through the baking, residual solvents may be completely removed, and the polymerization of the alignment layer may be completed. The heat-resistance of the alignment layer may be increased.

The baking may be conducted at a similar temperature and for a similar time period as the main-curing step. In accordance with an exemplary embodiment of the present invention, the baking may be conducted at from about 150 degrees C. to about 270 degrees C. or from about 170 degrees C. to about 240 degrees C., or for about 210 degrees C. The baking may be conducted for from about 500 seconds to about 1,000 seconds, or for from about 700 seconds to about 900 seconds, or for about 800 seconds.

The baked base substrate is then cooled.

In accordance with an exemplary embodiment of the present invention, a second cleaning may be additionally conducted with respect to the baked base substrate prior to forming a liquid crystal layer. Through the second cleaning, foreign materials (for example, foreign materials attached during returning process) possibly generated on the base substrate after the baking may be removed.

The second cleaning may be a dry cleaning. The dry cleaning is a cleaning using a gas, and may be conducted by spraying an ultrasonic wave applied gas (for example, air) onto the base substrate, by making vacuum around the base substrate, or by using an air knife. Through the dry cleaning, defects generated, for example, from fume particles generated during the baking may be removed.

The second cleaning in accordance with an exemplary embodiment of the present invention may be conducted by using ultrasonic waves. Foreign materials remaining on the surface of the base substrate may be removed by spraying an ultrasonic wave applied air onto the base substrate.

On the first substrate and/or the second substrate including the alignment layer formed by the above-described method, a liquid crystal layer may be formed.

In accordance with an exemplary embodiment of the present invention, defects generated by the fixing of the foreign materials may be prevented through conducting the first cleaning prior to the baking of the base substrate. When the base substrate is directly baked after exposing the base substrate, the foreign materials generated, for example, during the returning of the base substrate may be fixed onto the surface of the alignment layer through the baking. After the baking, the foreign materials fixed onto the surface of the alignment layer might not be easily removed by the cleaning, and pixel defects may be generated. The first cleaning prevents the generation of the defects by removing the foreign materials before the fixing of the foreign materials during baking.

Figure 8:
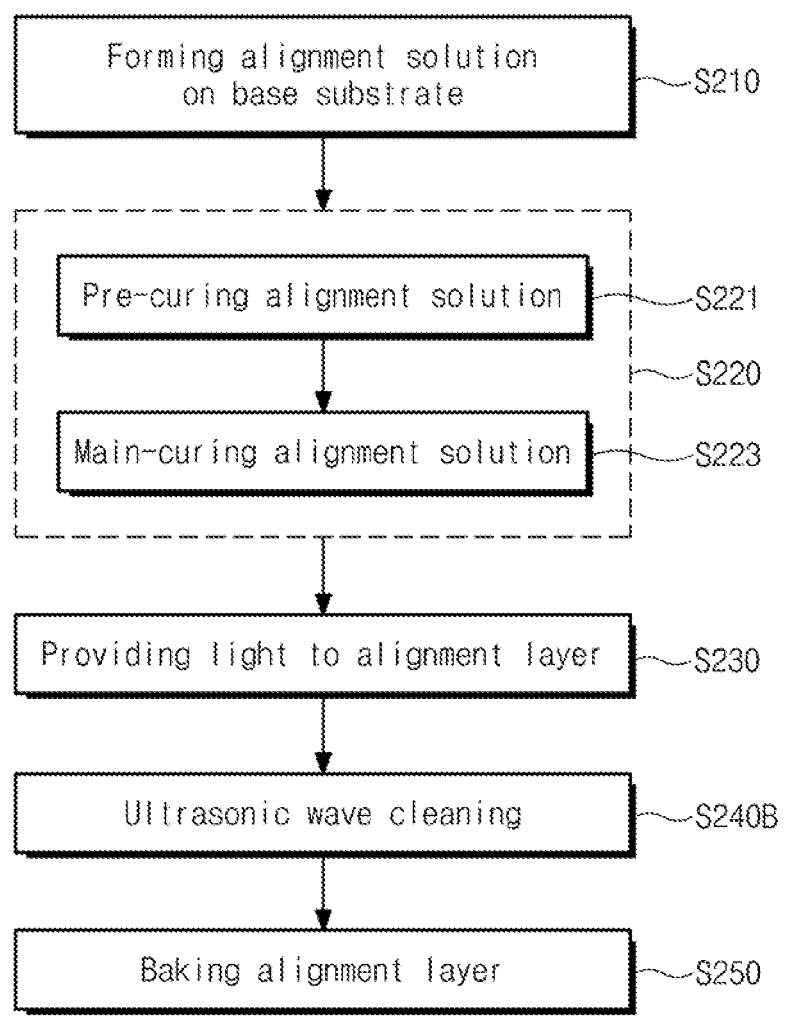
FIG. 8 is a flow chart illustrating a method of forming an alignment layer according to an exemplary embodiment of the present invention.

FIG. 8 is a flow chart illustrating a method of forming an alignment layer according to an exemplary embodiment of the present invention. In the method of forming the alignment layer in accordance with the exemplary embodiment of the present invention, different parts from the exemplary embodiment of FIG. 7 will be explained, and omitted parts will follow the exemplary embodiments of FIG. 7 for convenience of explanation.

The method of forming the alignment layer according to an exemplary embodiment will be explained in detail referring to FIGS. 6 and 8.

First, an alignment solution is formed on a base substrate (S210), and the alignment solution is cured (S220). The curing step includes a pre-curing step of the alignment solution (S221) and a main-curing step of the alignment solution (S223).

Then, an exposing process for aligning the alignment layer by providing light to the alignment layer is conducted (S223). Through the aligning of the alignment layer, the anisotropic properties are imparted to the alignment layer.

The base substrate may undergo a first cleaning. The first cleaning may be a dry cleaning (S240B). The first cleaning may use a gas, and may be conducted by spraying an ultrasonic wave applied gas (for example, air) onto the base substrate, by making a vacuum around the base substrate, or by using an air knife.

The first cleaning step in accordance with an exemplary embodiment of the present invention may be conducted by using ultrasonic waves. In this case, the ultrasonic wave applied air may be sprayed onto the base substrate to remove foreign materials remaining on the surface of the base substrate.

Then, the alignment layer is baked (S250), and the baked base substrate may be cooled.

In accordance with an exemplary embodiment of the present invention, a second cleaning may be conducted with respect to the baked base substrate prior to forming a liquid crystal layer. The second cleaning may be a wet cleaning, and the second cleaning may be conducted by using DI water as in, for example, the exemplary embodiment of FIG. 7. A bubble jet cleaning and/or an air knife cleaning may be additionally conducted.

On the first substrate and/or the second substrate including the alignment layer formed by the above-described method, a liquid crystal layer may be formed.

In accordance with exemplary embodiments of the present invention, defects generated by the fixing of foreign materials may be prevented by conducting the first cleaning prior to the baking of the base substrate, as illustrated in exemplary embodiments.

Figure 9:
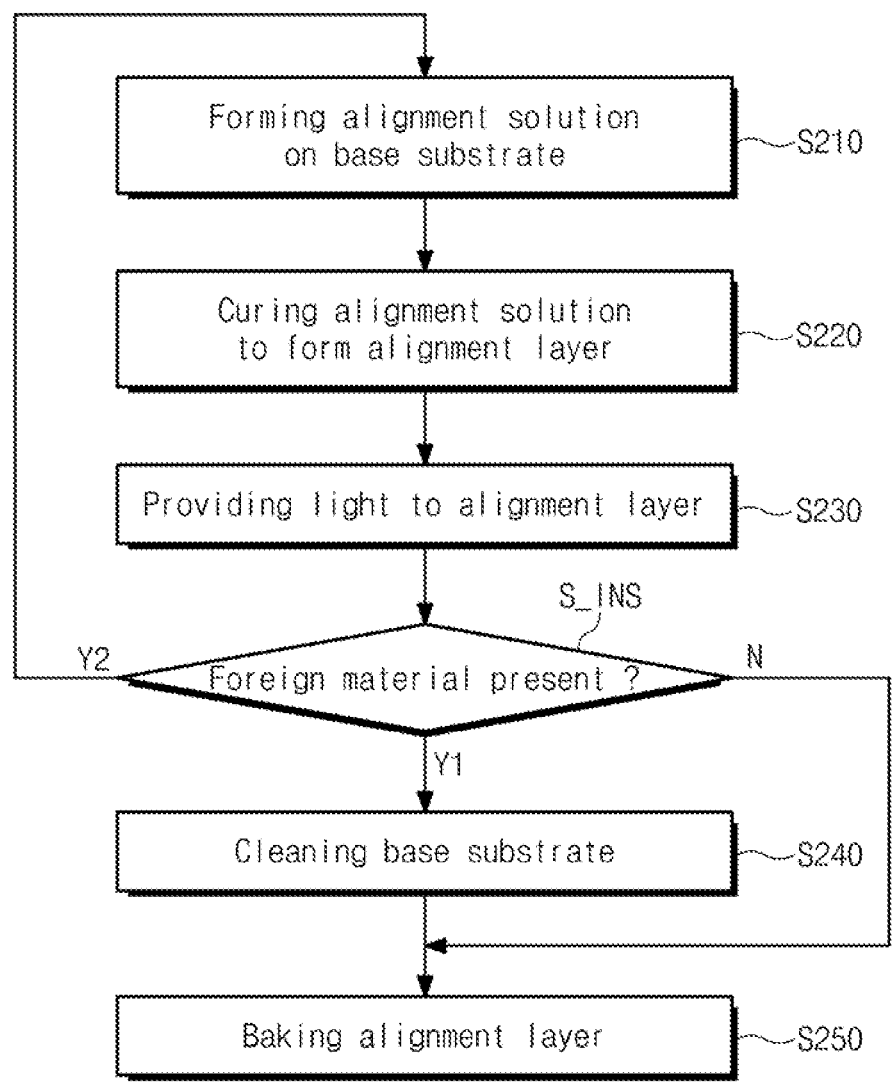
FIG. 9 is a flow chart illustrating a method of forming an alignment layer according to an exemplary embodiment of the present invention.

FIG. 9 is a flow chart illustrating a method of forming an alignment layer according to an exemplary embodiment of the present invention. A method of forming an alignment layer in accordance with the exemplary embodiment will be described in detail below with reference to FIGS. 6, 7 and 9.

First, an alignment solution is formed on the base substrate (S210), and the alignment solution is cured (S220). The curing step may include a pre-curing step of the alignment solution (S221) and a main-curing step of the alignment solution (S223).

An exposing process for aligning the alignment layer is conducted by providing light to the alignment layer (S230). Through the aligning process of the alignment layer, anisotropic properties may be imparted to the alignment layer.

After the exposing process, the presence of foreign materials on the surface of the alignment layer may be inspected (S_INS). In an exemplary embodiment of the present invention, a detector of foreign materials may take a picture on the surface of the alignment layer and evaluate the presence of the foreign materials on the surface of the alignment layer.

When foreign materials are found on the surface of the alignment layer (Y1), a wet cleaning or a dry cleaning on the base substrate is conducted (S240). The wet cleaning may be conducted using DI water, for example, as in the above-described exemplary embodiments. A bubble jet cleaning and/or an air knife cleaning may be conducted. The dry cleaning may be conducted by using ultrasonic waves, for example, as in other exemplary embodiments.

Foreign materials may be detected on the surface of the alignment layer based on identifying kinds of foreign materials, sizes of foreign materials or a number of foreign materials. The kind of the foreign materials, the size of the foreign materials and/or the number of the foreign materials may be reduced to a level not generating defects.

Selectively, when the foreign materials are found on the surface of the alignment layer (Y2), the base substrate might not be cleaned or baked and may be returned to the forming step of the alignment solution (S210). For example, when the foreign materials are found on the surface of the alignment layer, and/or when the foreign materials are not found to be removed through the cleaning, the forming step of the alignment layer may be repeated.

When the foreign materials are found on the surface of the alignment layer, the performance of the cleaning step, or repeating the forming step of the alignment layer may be selected based on, for example, the level of the defects identified based on the kinds of the foreign materials, the size of the foreign materials, the number of the foreign materials, or the like.

When the foreign materials are not found on the surface of the alignment layer (N), the first cleaning of the base substrate (S240) may be omitted. In this case, the baking step of the base substrate (S250) may be conducted immediately.

The baked base substrate may be cooled, and the second cleaning may be selectively conducted.

A liquid crystal layer may be formed on the first substrate and/or the second substrate including the alignment layer formed by the above-described method.

In accordance with an exemplary embodiment, the presence of the foreign materials may be detected after exposing the alignment layer to determine whether the cleaning of the base substrate should be performed. When the foreign materials are not found from the detection of the foreign materials, the cleaning step of the base substrate may be omitted, and the forming of the alignment layer may be simplified. When the foreign materials are found, the foreign materials may be removed through the cleaning process or the forming of the alignment layer again. An effective handling of the foreign materials may be possible, and the generation of defects due to the fixing of the foreign materials may be prevented.

Figure 10:
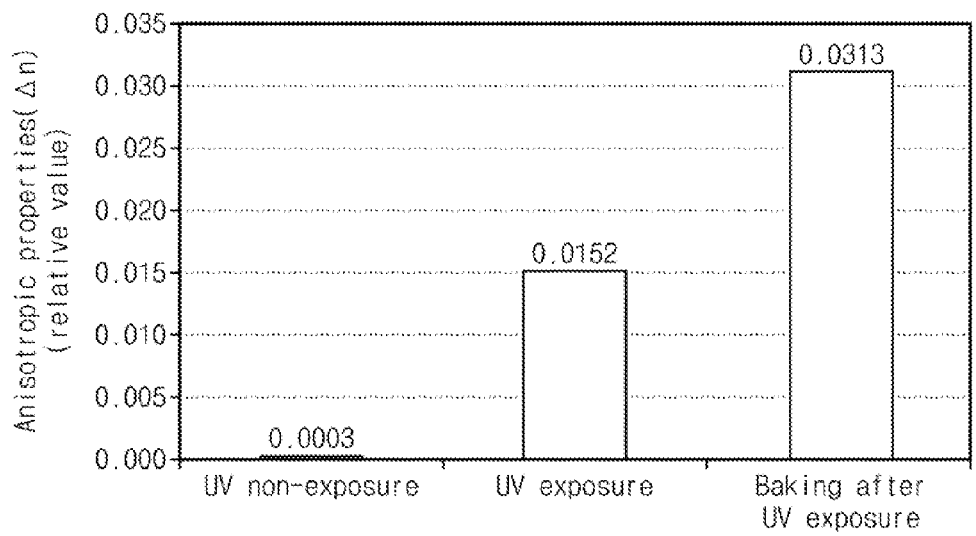
FIG. 10 is a graph illustrating anisotropic properties of alignment layers with or without conducting baking after exposing.

FIG. 10 is a graph illustrating anisotropic properties of alignment layers with or without conducting baking after exposing. In FIG. 10, an alignment layer is formed by using a photo decomposable material (RN-2986), and the anisotropic properties are evaluated. All conditions are the same except for the light exposure (e.g., UV exposure) and the baking. In FIG. 10, "UV non-exposure" represents the case where the baking is conducted without exposing after forming the alignment layer, "UV exposure" represents the case where the ultraviolet exposing is conducted, however the baking is not conducted, and "baking after UV exposure" represents the case where the ultraviolet exposing and the baking are conducted one by one. In this case, for example, the ultraviolet light was exposed by 1 J, and the baking was conducted at 210 degrees C. for 1,800 seconds.

Referring to FIG. 10, the anisotropic properties are very low when the ultraviolet exposing is not conducted. The anisotropic properties are very high when the ultraviolet exposing is conducted when compared with the case when the ultraviolet exposing is not conducted.

When the ultraviolet exposing is conducted without baking, the anisotropic properties are found, however are lower than when baking after UV exposure. When the baking is conducted after the ultraviolet exposing, the refractive index anisotropic properties are increased by about 2.1 times compared to when only the ultraviolet exposing is conducted. When the baking is not conducted, the anisotropic properties of the alignment layer may be low, and the uniform control of the liquid crystal molecules in a certain direction might not be accomplished. When the uniform control of the liquid crystal molecules is not accomplished, the contrast ratio of finally fabricated liquid crystal display device may be decreased.

When the baking is conducted, the anisotropic properties may be increased, and the liquid crystal molecules may be uniformly controlled. Thus, the contrast ratio may be increased.

Figure 11:
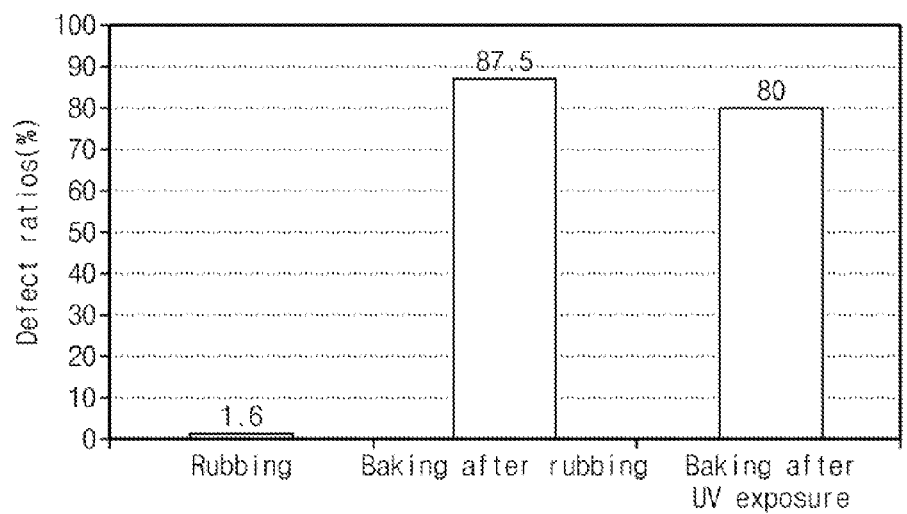
FIG. 11 is a graph for comparing defect ratios according to the methods of forming alignment layers.

FIG. 11 is a graph for comparing defect ratios according to exemplary methods of forming alignment layers. In FIG. 11, the defect ratio represents the defect ratio according to the generated foreign materials at the forming step of the alignment layer. All conditions were the same except for the method of forming the alignment layer. In FIG. 11, "rubbing" represents the case where a rubbing process other than the exposing is conducted (without baking) after forming the alignment solution, "baking after rubbing" represents the case where the baking is conducted after conducting the rubbing, and "baking after ultraviolet exposing" represents the case where the ultraviolet exposing and the baking are conducted one by one. The cleaning was omitted in this example.

Referring to FIG. 11, the defect ratio due to foreign materials is low when the rubbing is conducted without the baking. The defect ratio is high when the baking is conducted after conducting the rubbing or the ultraviolet exposing. When the baking is conducted, the foreign materials on the surface of the alignment layer are fixed onto the surface of the alignment layer, and the fixed materials are not removed even though the cleaning is performed in a following process. Thus, the cleaning process for removing the foreign materials before the baking may be needed.

Figure 12:
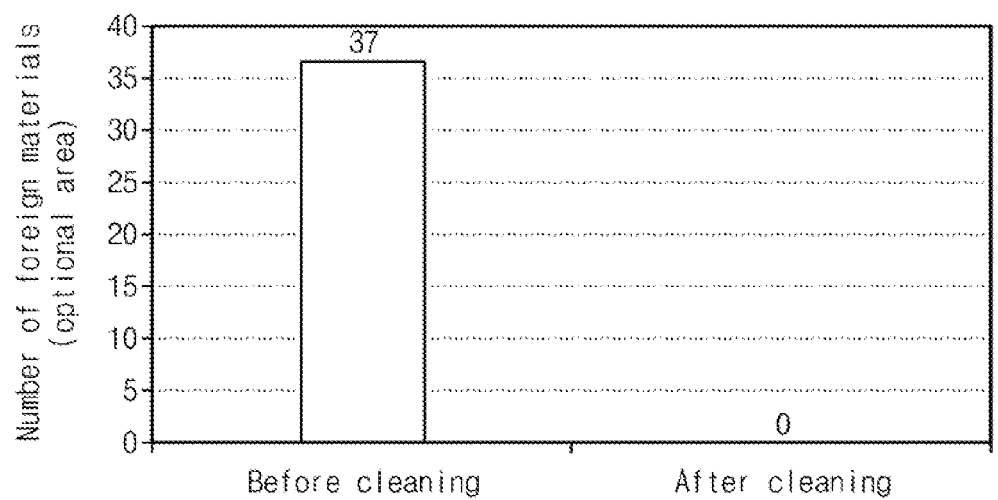
FIG. 12 is a graph illustrating the number of foreign materials when conducting cleaning using ultrasonic waves after conducting exposing.

FIG. 12 is a graph illustrating the number of foreign materials when conducting cleaning using ultrasonic waves after conducting exposing in accordance with exemplary embodiments of the present invention. Referring to FIG. 12, the number of the foreign materials was about 37 after exposing, and was decreased to about 0 after cleaning using ultrasonic waves. Thus, the foreign materials may be effectively removed by using the ultrasonic wave cleaning.

Figure 13:
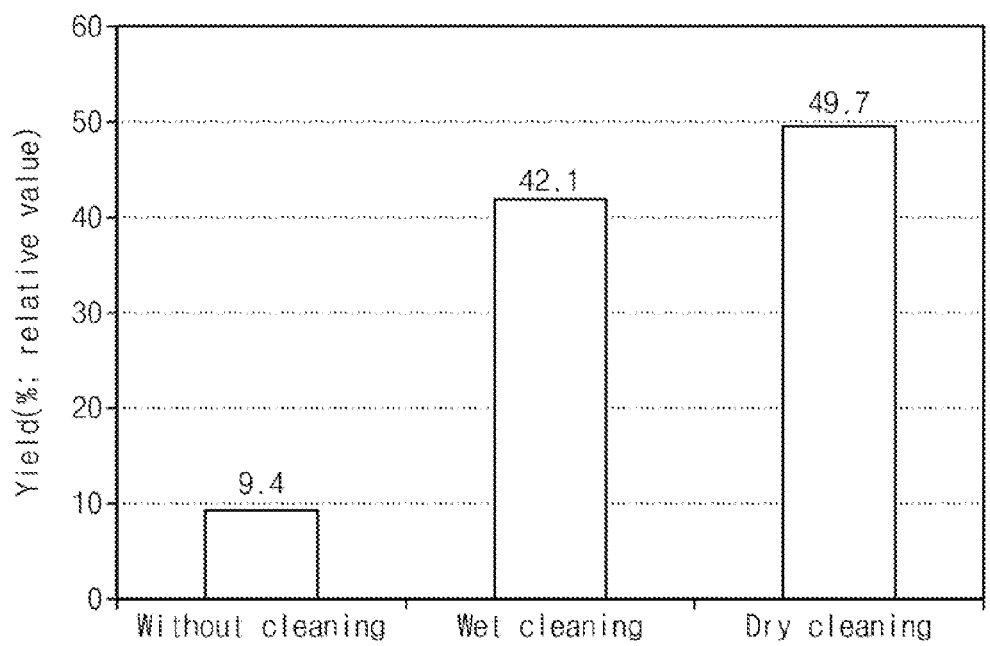
FIG. 13 illustrates yields of finally fabricated liquid crystal display devices with or without conducting cleaning.
Figure 14:
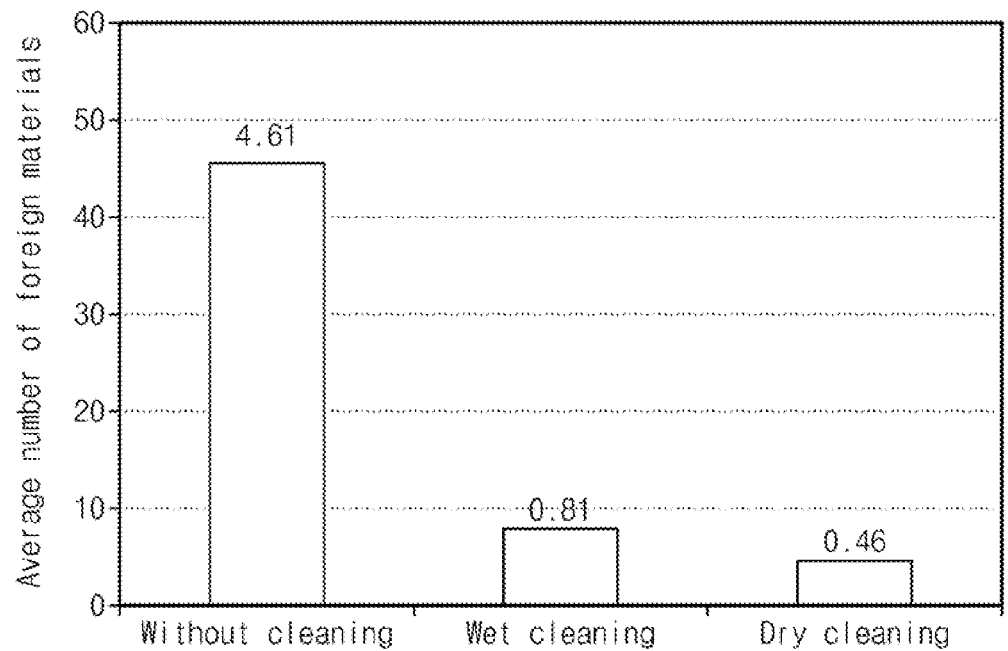
FIG. 14 is a graph illustrating the number of foreign materials of finally fabricated liquid crystal display devices with or without conducting cleaning.

FIGS. 13 and 14 illustrate yields and the number of foreign materials of finally fabricated liquid crystal display devices with or without conducting cleaning. In FIGS. 13 and 14, all conditions were the same except for conducting the cleaning after exposing and the kind of the cleaning.

In FIGS. 13 and 14, "without cleaning" represents the case where the baking is conducted immediately after the exposing, "wet cleaning" represents the case where the cleaning using DI water was conducted after exposing, and baking was conducted after the cleaning, and "dry cleaning" represents the case where the cleaning using ultrasonic waves was conducted after exposing, and the baking was conducted after the cleaning.

Referring to FIGS. 13 and 14, the yield is increased, and the number of the foreign materials is decreased when the cleaning is conducted after the exposing when compared with the case where the cleaning is not conducted. The yield is increased when the wet cleaning is conducted by about 4.5 times when compared with the case where the cleaning is omitted. The number of the foreign materials is decreased by about 5.7 times. For the dry cleaning, the yield is increased by about 5.3 times and the number of the foreign materials is decreased by about 10 times when compared with the case where the cleaning is omitted.

Figure 15:
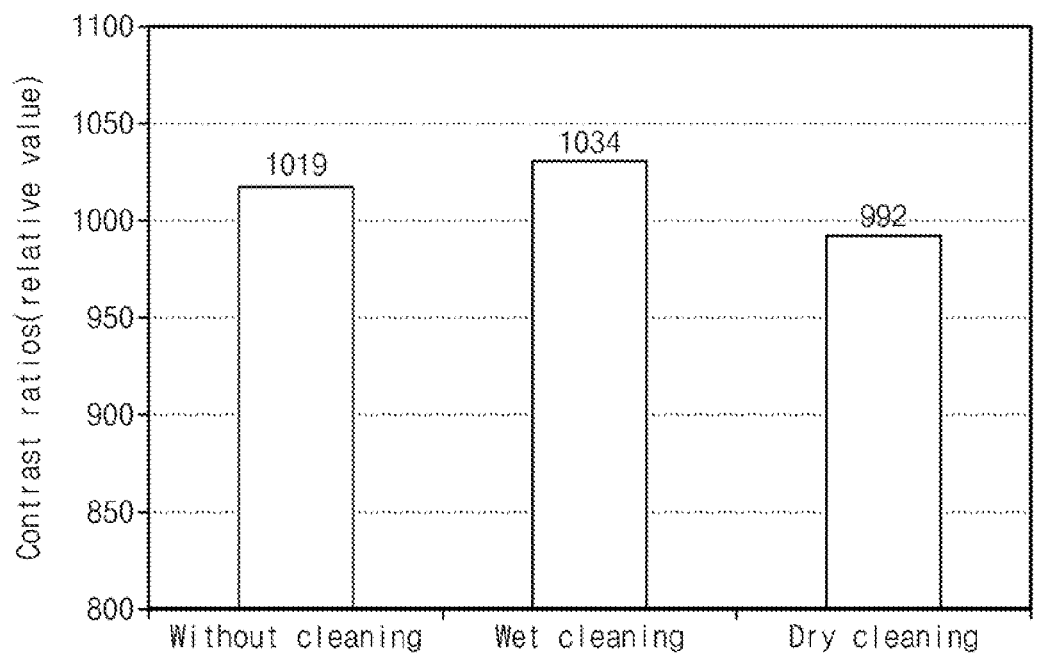
FIG. 15 is a graph illustrating contrast ratios with or without conducting cleaning.
Figure 16:
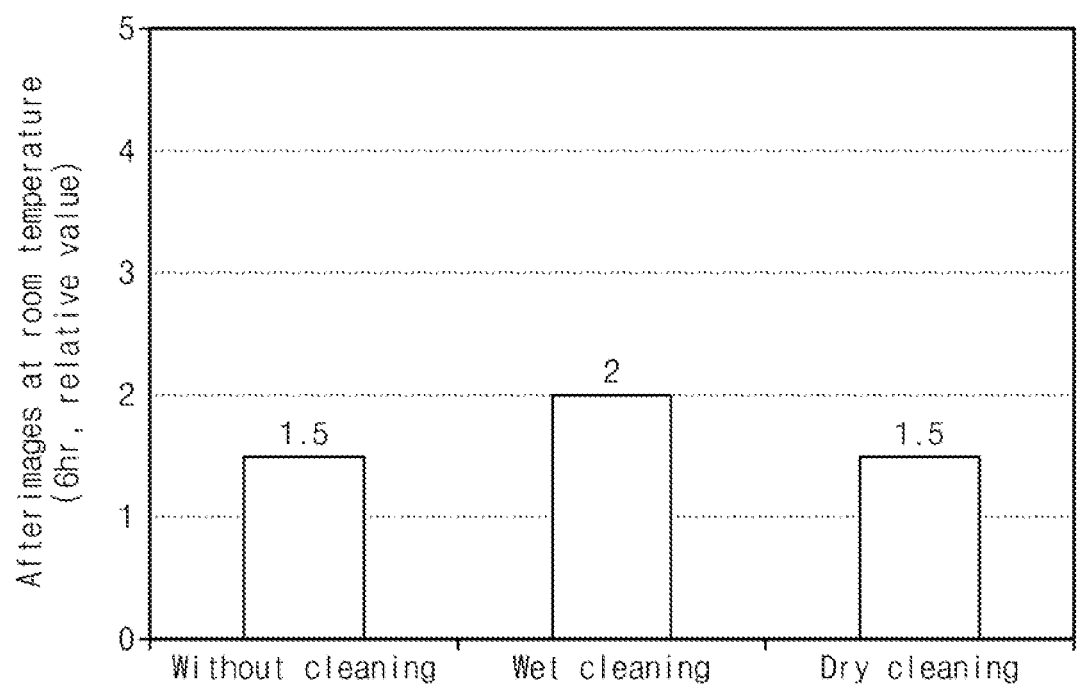
FIG. 16 is a graph illustrating afterimages with or without conducting cleaning.

FIGS. 15 and 16 are graphs illustrating contrast ratios and afterimages with or without conducting cleaning. In FIGS. 15 and 16, all conditions are the same except for the cleaning after exposing and the kind of the cleaning. In FIGS. 15 and 16, "without cleaning" represents the case where the baking is conducted immediately after exposing, "wet cleaning" represents the case where the baking is conducted after conducting the cleaning using DI water after exposing, and "dry cleaning" represents the case where the baking is conducted after cleaning using ultrasonic waves after exposing.

Referring to FIGS. 15 and 16, similar contrast ratios and afterimages at room temperature are illustrated for the case where the cleaning is omitted, and the wet/dry cleaning is conducted. The values are satisfactory on the basis of a certain reference. Side effects need not be generated even with conducting the wet cleaning or the dry cleaning.

The above-disclosed subject matter is to be considered illustrative and not restrictive.

For example, the fabrication method of the liquid crystal display device in accordance with exemplary embodiments of the present invention may be applied in various modes as well as a PLS mode or an IPS mode.

While the present invention has been particularly shown and described with reference to exemplary embodiments thereof, it will be understood by those of ordinary skill in the art that various changes in fo in and detail may be made therein without departing from the spirit and scope of the present invention.

What is claimed is:

1. A fabrication method of a liquid crystal display device, the method comprising:
   forming a pixel electrode on a first base substrate;
   forming a common electrode on the pixel electrode;
   forming a first alignment layer on the first base substrate;
   forming a second alignment layer on a second base substrate;
   disposing a liquid crystal on the first alignment layer or the second alignment layer; and
   combining the first base substrate and the second base substrate,
   wherein the forming of at least one of the first alignment layer and the second alignment layer comprises:
      forming an alignment solution on a corresponding base substrate of the first and second base substrates;
      curing the alignment solution to form an alignment layer;
      irradiating the base substrate to align the alignment layer;
      performing a first cleaning of the base substrate before baking the alignment layer;
      baking the alignment layer; and
      performing a second cleaning on the base substrate after baking the alignment layer, wherein the liquid crystal layer is disposed on the first alignment layer or the second alignment layer after performing the second cleaning.

2. The method of claim 1, wherein the first cleaning is a wet cleaning.

3. The method of claim 2, wherein the first cleaning comprises cleaning the base substrate using de-ionized water.

4. The method of claim 3, wherein the first cleaning further comprises using a bubble jet and using an air knife.

5. The method of claim 1, wherein the second cleaning is a dry cleaning.

6. The method of claim 5, wherein the second cleaning is conducted using ultrasonic waves.

7. The method of claim 1, wherein the curing the alignment solution comprises:
pre-curing the alignment solution at a first temperature; and
main-curing the alignment solution at a second temperature higher than the first temperature.

8. The method of claim 1, wherein irradiating the base substrate includes exposing the base substrate to ultraviolet light, infrared light, far-infrared light, electromagnetic waves or ionizing radiation.

9. The method of claim 1, further comprising inspecting a presence of foreign materials on the base substrate after exposing the alignment solution.

10. The method of claim 1, wherein the alignment solution includes a member of a photo-reactive group, and the photo-reactive group is a cross-linkable reactive group inducing photo-polymerization or photo-isomerization with an adjacent reactive group when irradiated.

11. The method of claim 10, wherein the alignment solution is a cyclobutane-based compound or an azobenzene-based compound.

12. A method of preparing an alignment layer, the method comprising:
forming a pixel electrode on a base substrate;
forming a common electrode on the pixel electrode;
forming an alignment layer on the base substrate,
wherein forming the alignment layer, comprising comprises:
forming an alignment solution on a base substrate;
pre-curing the alignment solution at a first temperature;
main-curing the alignment solution at a second temperature greater than the first temperature;
exposing the formed alignment layer to light and imparting anisotropic properties to the alignment layer;
performing ultrasonic wave cleaning of the alignment layer and removing foreign materials from the base substrate before baking the alignment layer;
baking the alignment layer; and
performing a second cleaning on the base substrate after baking the alignment layer.

13. The method of claim 12, wherein the ultrasonic wave cleaning includes forming a vacuum around the substrate.

14. The method of claim 12, wherein the ultrasonic wave cleaning is performed using an air knife.

15. The method of claim 12, wherein the alignment layer is further cleaned by a wet cleaning method using deionized water.

16. The method of claim 12, wherein the alignment layer is further cleaned by bubble jet cleaning.

* * * * *